Aug. 26, 1941.   R. F. BUTLER ET AL   2,253,927
CONTROLLED TEMPERATURE BUTTER DISH
Filed March 25, 1940
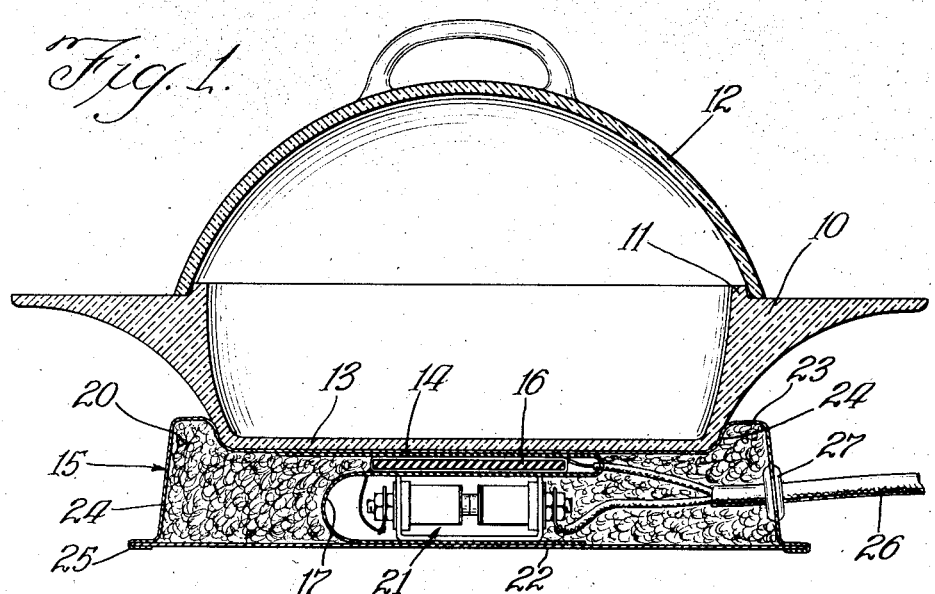
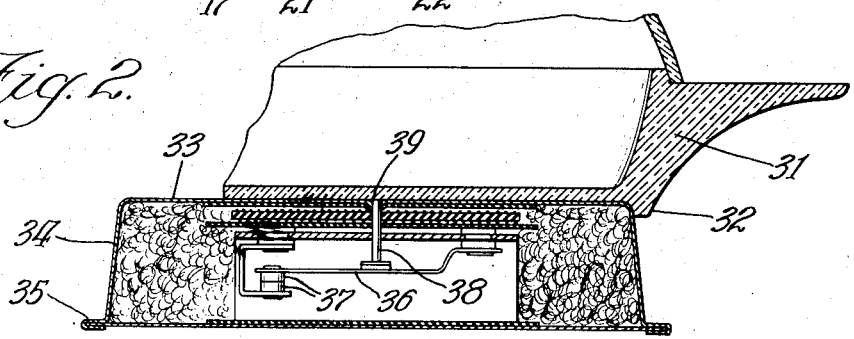
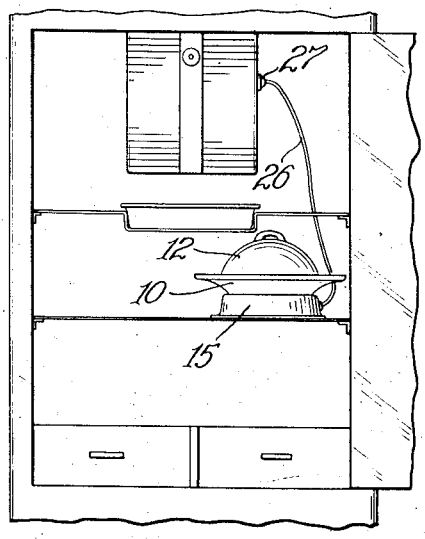
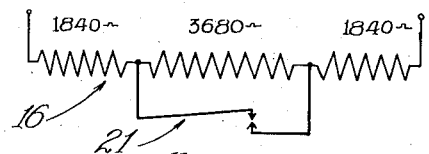
Inventors:
Ralph F. Butler and
Oliver D. Westerberg
By Tefft & Tefft
Attys.

Patented Aug. 26, 1941

2,253,927

UNITED STATES PATENT OFFICE 2,253,927

CONTROLLED TEMPERATURE BUTTER DISH

Ralph F. Butler and Oliver D. Westerberg, Chicago, Ill.

Application March 25, 1940, Serial No. 325,748

1 Claim. (Cl. 219—43)

This invention relates to a device for keeping table butter in proper condition for use while the butter is stored in a modern low-temperature refrigerator.

Although most food can best be stored and kept at low temperatures, in the case of table butter such low temperatures harden the butter to a degree that it cannot be spread and used in the normal manner.

It will be readily appreciated that the situation cannot be satisfactorily remedied by adjusting the temperature of the refrigerator, since to properly preserve other foods it is essential that the temperature of the refrigerator cabinet be maintained at a temperature of not more than 46° Fahrenheit. In fact, in view of the present efficiency of most commercial refrigerators and the prevailing custom of marketing frozen foods which may be preserved indefinitely if not permitted to thaw, there are many instances in which the temperatures may be as low as 34° F. on the cabinet shelves.

Similarly, butter cannot be properly preserved if removed from the refrigerator, since ordinary room temperatures range from about 70° F. upward, while butter is in most satisfactory condition for use at a temperature of approximately 58° F.

In view of this state of facts it may be safely said that attempts to condition butter properly by adjusting the refrigerator or removing the butter from the cabinet result in much avoidable spoilation.

Further, it is a continual source of nuisance to the busy housewife, particularly in homes with small children who waste butter when too hard to spread.

It is, therefore, the particular object of this invention to provide a device that will keep table butter in proper condition for use when stored in a low temperature refrigerator.

Another object is to provide a butter-keeping device which is small in size, low in cost, durable, and safe in operation.

Other objects and benefits will be disclosed hereinafter.

Referring now to the drawing,

Fig. 1 is a central sectional view through one preferred form of the invention;

Fig. 2 is a central sectional view similar to Fig. 1, illustrating a slightly modified embodiment of the invention;

Fig. 3 is a circuit diagram of the preferred electrical circuit; and

Fig. 4 is a schematic view of the preferred form of butter conditioning device as located in a refrigerator cabinet.

In general, the preferred embodiment of the invention comprises a covered glass butter dish shaped to fit and lie in intimate surface contacting relationship with a dish base assembly arranged to house a miniature electric heating unit. The arrangement is such that the heating unit is maintained in a very close and intimate heat transfer relationship with the surface of the butter dish, to the end that the heat generated by the electrical resistance unit will be conducted almost entirely through the butter dish to maintain the butter therein at the desired temperature. In furtherance of this aim the housing in which the heating element is located is packed with thermal insulation and the heating capacity of the electrical heating element is carefully calculated to produce the exact amount of heat which will normally be radiated and conducted away from the butter dish when such butter dish is at the desired degree of temperature. Thus, a balance is maintained between the heat generated by the resistance unit and the heat given off by the butter dish and as long as this balance remains undisturbed, the temperature of the butter within the covered dish must of necessity remain constant.

Referring now more particularly to Fig. 1, the structure illustrated comprises a dish 10 including a flange 11 over which a cover 12 is fitted. The dish 10 serves as the butter compartment and its lower surface 13 is adapted to lie in surface contacting relationship with the central flat plate portion 14 of the base member 15. The plate portion 14 may be of any thin sheet metal, but it is at present preferred to use spun aluminum for the reasons that the aluminum affords unusually good heat conduction and also lends to the attractiveness of the appearance of the base.

An electrical heating element 16 is positioned immediately below the plate surface 14 and is separated therefrom by a single thickness of thin varnished cambric insulation. It will be appreciated that the extreme thinness of this insulation affords an unusually intimate contacting relationship with the plate surface 14 and, therefore, provides for exceptionally efficient heat transfer from the heating element 16 to the dish 10. However, the use of this type of insulation is permissible only by virtue of the fact that the heating element 16 is wound to generate a low temperature over a comparatively large area as distinguished from a small area of high temperature, which would give an equivalent amount of heat, but from which the heat could not be transferred so efficiently without danger of charring or burning the thin insulating sheet 17.

The preferred form of heating element illustrated consists of a thin rectangular layer of insulation on which a multiplicity of turns of No. 44 alloy resistance wire have been wound in close spaced relationship with each other. The total resistance of the coil should be 7,360 ohms and it is preferred to divide this coil into three sections in which each of the end sections have a resistance of 1,840 ohms and the central section of 3,680 ohms. The center section is shunted by a thermostat 21, which may be of any conventional design, but in the preferred construction it includes a snap spring and bi-metallic actuating element housed within a sheet metal channel positioned immediately below the heating element 16. These resistances provide for a power consumption of 3.8 watts when the thermostat is closed and the outer coils only are in the circuit. With the thermostat open and all of the coils in the circuit, the power consumption is 1.9 watts.

It has been found by experiment that by the use of a heating element of this capacity the balance between the heat generated and the heat radiated from the butter dish may be properly maintained, and the butter held at a constant temperature of about 58° F.

To properly insulate the thermostat 21, it is preferred to double the thin sheet of insulating cambric 17 back along the lower side of the heating element 16 and above the thermostat 21, thence back again below the lower surface of the thermostat 21 in such a manner as to insulate the thermostat from the heating element on the upper side and from the metal base plate 22 on the lower side. The base plate 22 is so positioned as to bear against the operating assembly comprising the thermostat, heating element and insulation and clamp these units firmly against the upper hot plate portion 14. The insulation of the heating element and thermostat is completed by filling the entire chamber with thermal insulating material, such as the rock wool 20.

The plate portion 14 is provided with a circular annular flange 23 dimensioned to closely fit the lower surface of the dish 10 and prevent lateral displacement of the dish 10 with respect to the base 15. The flange 23 includes downwardly extending side wall portions 24 terminating in an annular bead 25 which encloses the peripheral edge of the base plate 22 and establishes a complete and permanent seal between the imperforate upper housing and base plate. This exact method of assembly is of extreme importance when considered in view of the use to which the device is adapted for it provides an entirely waterproof and vaporproof housing for the heating element and thermostat and at the same time provides a smooth and regular outer surface for the device which may be easily cleaned in the event that foods or beverages are spilled over the device. Moreover, the assembled unit constructed in this manner is capable of standing much physical abuse resulting from careless handling, etc., without being damaged. It will be noted that the lead wire 26 penetrates a perforation in the side wall 24, but the provision of a closely fitted rubber grommet 27 seals this orifice completely and prevents any possibility of moisture entering the inner compartment in which the operating elements are housed.

A modified form of the device illustrated in Fig. 2 is constructed in a manner substantially similar to the device just illustrated with the exceptions that the flanged arrangement between the butter dish and the base have been altered and a button-operated switch has been substituted for the thermostat. In this figure it will be seen that the dish 31 includes a downwardly extending flange 32 dimensioned to surround the outer peripheral edge of the top plate surface 33, and direct any moisture which may condense on the butter dish at any time downwardly to the flange 32 and thence down the side walls 34 to the bead 35. This construction is desirable in the event that a mechanical circuit interrupter, such as the contactor 36 operated by the actuator button 38, is substituted for the thermostat, since it forestalls any chance of moisture entering the device around the movable button.

The contactor 36 includes a pair of contacts 37 controlled by the actuator button 38, which extends from the contactor 36 upwardly through an orifice 39 in the top plate 33. The arrangement is such that when the dish 31 is placed in position on the base, the actuator button 38 is moved downwardly to close the contacts 37 and complete the circuit through the heating element, but when the dish 31 is removed from the base springs associated with the contacts 37 cause these contacts to open and interrupt the circuit. It is considered obvious, of course, that the contacts 37 may be arranged to control only the center unit of the heating element as provided in the case of the thermostat 31 just described, but it is also contemplated that if desired, the contacts 37 may be arranged to break the circuit through all of the resistance.

The general outside appearance of the entire butter conditioning assembly is illustrated in Fig. 4, where it will be seen that the electrical lead 26 is provided with a plug 27 adapted to be connected with an interior electric light socket in the refrigerator or with any other suitable power source.

From the foregoing description it will be seen that by the use of a device as herein disclosed, it is possible to maintain a butter container at a constant and proper temperature, notwithstanding the fact that the refrigeration compartment is far below the desirable temperature level and the atmospheric temperature is greatly above the satisfactory maximum.

Having thus described our invention,
We claim:

In combination, a refrigerator cabinet including insulated cabinet walls, a door, and a mechanical cooling unit in said cabinet adapted and arranged to maintain the interior of the cabinet at a temperature of below fifty (50) degrees Fahrenheit; a butter conditioning device comprising a warming plate and an electrical heating element clamped under said warming plate in heat transfer relationship with said plate, said heating element being insulated from the warming plate both thermally and electrically; a covered butter dish in intimate thermal contacting relationship with said warming plate and adapted to be supported on its bottom by the warming plate, said warming plate and dish including integral annular shoulder surfaces adapted to engage each other and prevent relative lateral movement of the dish with respect to the said warming plate, a base plate below said electrical heating element, a peripheral sealed joint between said warming plate and said base plate to provide a substantially imperforate, vaporproof, waterproof housing for said electrical heating element; the butter dish, warming plate, and heating element being designed and proportioned to provide a proper interior temperature of approximately fifty-eight (58) degrees Fahrenheit in the butter dish by maintaining a balance between the heat transferred to the dish by the heating element and the heat radiated from the dish.

OLIVER D. WESTERBERG.
RALPH F. BUTLER.